May 15, 1956     J. A. BOLTON ET AL     2,745,554

FILTERING SYSTEM FOR SCREENING IRRIGATION WATER

Filed Aug. 11, 1953     2 Sheets-Sheet 1

INVENTORS
John A. Bolton
Gordon C. McKinley

May 15, 1956   J. A. BOLTON ET AL   2,745,554
FILTERING SYSTEM FOR SCREENING IRRIGATION WATER
Filed Aug. 11, 1953   2 Sheets-Sheet 2

INVENTORS
John A. Bolton
Gordon C. McKinley
BY

United States Patent Office 2,745,554
Patented May 15, 1956

2,745,554

FILTERING SYSTEM FOR SCREENING IRRIGATION WATER

John A. Bolton, Prosser, and Gordon C. McKinley, Byron, Wash., assignors of thirty-three and one-third per cent to John Anderson, Yakima, Wash.

Application August 11, 1953, Serial No. 373,526

4 Claims. (Cl. 210—152)

This invention relates to apparatus and method for screening water, and finds perhaps its greatest usefulness as an apparatus and method for screening water in irrigation systems, particularly systems in which the water for irrigation purposes issues from a plurality of stand-pipes equipped with delivery valves, the screening box functioning to remove from the water in advance of its delivery to the stand-pipes all silt, weed seed, moss and other foreign matter apt to clog the delivery valves if the same were permitted to reach the same.

The principal object of the present invention is to provide a screen box which is self-cleaning, thus obviating the need, as heretofore, of inactivating the screen box at fairly frequent intervals to remove foreign matter collected on the screen.

Other objects of the invention are concerned with the provision of a simple structure for the described purpose which will be of inexpensive and durable construction, which may be easily and quickly adjusted for maximum efficiency, and which will require negligible attention.

With the foregoing ends in view, the invention consists in the new method and in the novel construction, adaptation and combination of parts of apparatus for practicing said method, as will be hereinafter described and claimed.

Figure 1:
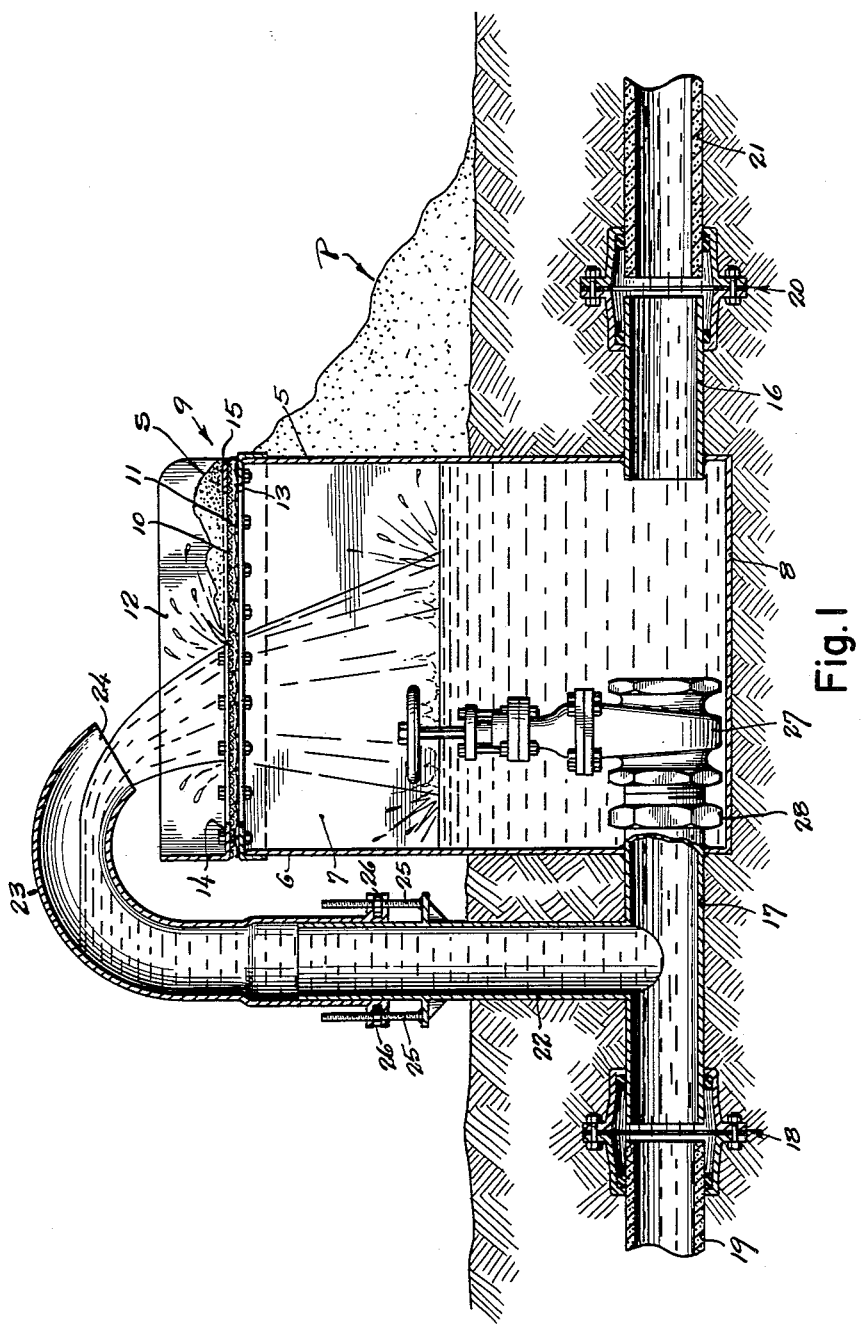
Figure 2:
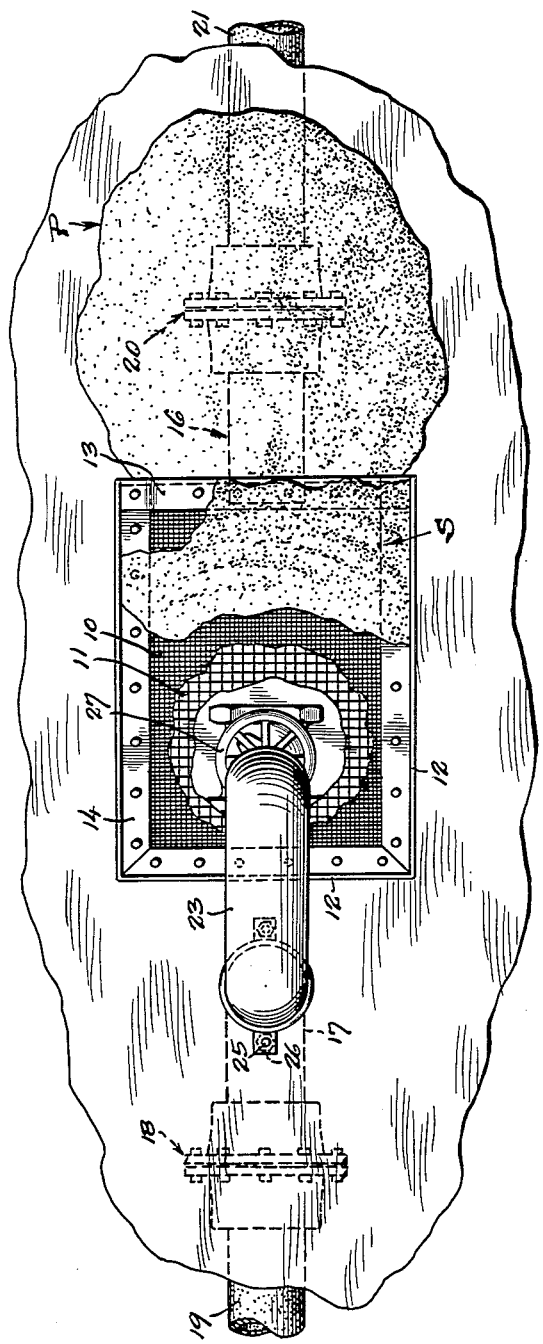

In the accompanying drawings:

Figure 1 is a longitudinal vertical sectional view illustrating apparatus constructed in accordance with the preferred teachings of the present invention, such apparatus being shown installed in a main irrigation line and being portrayed in the performance of the self-cleaning screening function for which it is intended; and Fig. 2 is a top plan view thereof with a part of the screen together with supporting hardware cloth which underlies the same broken away to expose the interior of the box.

The box proper of the present invention is comprised of an open-top receptacle which is or may be of rectangular plan configuration made by preference from metal although wood or a monolithic casting might be employed, and we denote the front and back walls of such receptacle by 5 and 6, respectively, the side walls by 7, and the floor by 8.

Said front, back and side walls rise to a common height, and removably fitted over the open top is a screening head designated generally by 9, such screening head presenting a generally horizontal screen 10, desirably of 40, 60 or 80 mesh copper wire-gauge, sustained upon a reinforcing sheet 11 of hardware cloth, and characterized, by preference, in that a splashboard 12 is provided along the back and the two side edges, rising well above the horizontal plane occupied by the screen. For convenience in manufacture, the screen and the hardware cloth are caught between the inturned boltably connected flanges 13 and 14 of two frame pieces each made from angle stock and placed back-to-back so that the other flange of the lower piece depends as a marginal lip skirting the screening head throughout the full circumference thereof, and the other flange of the upper piece rises to form the splash board.

The upper frame piece runs along only the back and the two sides of the head and has such sides connected across the front by a flat tie-plate 15.

Extending through the front and back walls of the box adjacent the floor there are provided respective pipes 17 and 16. Exteriorly of the box the former of these pipes connects by a coupling 18 with the main 19 of an irrigation supply line and the latter of such pipes connects by a coupling 20 with a delivery manifold 21 leading to a plurality of irrigation stand-pipes (not shown). From the fact that the pipes 16 and 17 are metal and the main and the manifold 19 and 21, respectively, are commonly of cement it is desirable that the couplings be of the expansion type. Those which I have elected to show, by way of illustration, are the product of Yakima Machine and Foundry Co. of Yakima, Washington.

Said pipe 17 is formed as a special T-fitting providing an upwardly extending side branch 22 spaced somewhat to the rear of the back wall 6, and finding a close telescoping fit upon the upper end of this side branch is a goose-necked tail pipe 23 curving up and over the screening head with the discharge mouth 24 pointing downwardly, preferably at an angle to the vertical. Bolt-and-nut components 25—26 of a screw jack are provided by the side branch and by the goose-necked tail pipe at diametrically opposite sides thereof to produce a simple and convenient means for the vertical adjustment of the tail pipe.

Secured by a union 28 upon the end of the pipe 17 which extends into the receptacle is a normally closed valve 27. This valve is preferably of the gate type so as, when open, to give a substantially uninterrupted full flow of water from the inner end of the pipe 17. Its purpose is to flush from the receptacle fine sedimentary matter which accumulates upon the floor of the receptacle after periods of fairly long usage.

Our screening box may be said to perform its self-cleaning function by the surge and splash effect of the stream of delivered water as it strikes the surface of the wire-gauge. Silt and other foreign matter screened from the water are kept off that portion of the screen receiving the direct force of the issuing water, wherefore such portion is precluded from becoming clogged. The surge and splash action continually throws the silt and other screenings off to the front and sides of the clear screening zone, and these screenings have the appearance of being more or less constantly "rolled" in a forward direction toward the open front end of the screening head. The silt mass deposits itself upon the ground and is removed at relatively infrequent intervals, usually three to four days, when the level of the pile rises to a point where the same interferes with the self-cleaning action of the screening head. In the drawings the letter S denotes a mass of the silt and other screenings moving by the water's surge along the surface of the screen and the letter P designates the ground deposit of such screenings beyond the open end of the screening head. It is believed self-evident that two factors govern the intensity of the water's surging force, (1) the volume of water delivered, and (2) the height of the fall. The permitted vertical adjustment of the tail pipe 23 enables the fall to be properly set for any given volume of flow. Either gravity or a pump may, perforce, be employed as the pressure agent responsible for forcefully lifting the irrigation water through the side branch 22 and its goose-necked tail pipe 23.

It is thought that the invention will have been clearly understood from the foregoing detailed description of our now-preferred embodiment. Changes in the details of construction will suggest themselves and we accordingly intend that no limitations be implied and that the hereto annexed claims be given the broadest interpretation which the employed language fairly permits.

What we claim is:

1. In a filtering system, an open-top receptacle, a screen covering said open top and having a mesh sufficiently fine to trap water-borne silt, a supply pipe and a discharge pipe disposed co-axial to one another and connecting with the interior of said open-top receptacle through opposite walls of the receptacle adjacent the floor of the latter, a valve normally closing the outlet end of said supply pipe, a main for carrying water in which silt is entrained under pressure into said supply pipe, and a side branch carrying said pressure supply of water from the supply pipe to a tail pipe discharging from a location elevated so above the screen as to splash an open stream of water onto the screen.

2. The filtering system of claim 1 in which the side branch rises along a wall of the receptacle and wherein the tail pipe is telescopically associated with said side branch to permit the discharge end of the tail pipe to be raised and lowered relative to the plane occupied by the screen.

3. A filtering system according to claim 2 having jack means for positioning the tail pipe in selected adjusted positions.

4. The filtering system of claim 1 in which the side branch is free of any valves and wherein said valve for the outlet end of the supply pipe is a gate valve in order that said outlet end can be completely opened without imposing any inhibition upon the issuing water.

References Cited in the file of this patent

UNITED STATES PATENTS

| | | |
|---|---|---|
| 690,524 | Knight | Jan. 7, 1902 |
| 818,868 | Buckner | Apr. 24, 1906 |
| 826,234 | Eichhorn | July 17, 1906 |
| 1,577,746 | Hansen | Mar. 23, 1926 |
| 1,903,774 | Burrel | Apr. 18, 1933 |
| 2,065,768 | Trafton | Dec. 29, 1936 |
| 2,189,361 | Hoge | Feb. 6, 1940 |
| 2,332,940 | Senke | Oct. 26, 1943 |
| 2,458,113 | Stevens | Jan. 4, 1949 |
| 2,467,143 | Mitchell | Apr. 12, 1949 |

FOREIGN PATENTS

| | | |
|---|---|---|
| 225,473 | Germany | Sept. 8, 1910 |